(12) United States Patent
Hallstein et al.

(10) Patent No.: US 8,442,363 B2
(45) Date of Patent: May 14, 2013

(54) APPARATUS FOR TRANSFORMING THE ASPECT RATIO OF AN OPTICAL INPUT FIELD BASED ON STACKED WAVEGUIDES

(75) Inventors: Sascha Hallstein, Los Gatos, CA (US); Donald A. Ice, Milpitas, CA (US)

(73) Assignee: C8 Medisensors Inc., San Jose, CA (US)

( * ) Notice: Subject to any disclaimer, the term of this patent is extended or adjusted under 35 U.S.C. 154(b) by 246 days.

(21) Appl. No.: 12/786,751

(22) Filed: May 25, 2010

(65) Prior Publication Data

US 2010/0310209 A1   Dec. 9, 2010

Related U.S. Application Data

(60) Provisional application No. 61/184,660, filed on Jun. 5, 2009.

(51) Int. Cl.
  *G02B 6/26* (2006.01)
(52) U.S. Cl.
  USPC .................. 385/27; 385/15; 385/31; 385/32
(58) Field of Classification Search .................. 385/15, 385/27, 31, 32
  See application file for complete search history.

(56) References Cited

U.S. PATENT DOCUMENTS

| | | | |
|---|---|---|---|
| 5,061,857 A | 10/1991 | Thompson et al. | |
| 5,396,350 A | 3/1995 | Beeson et al. | |
| 6,463,202 B1 | 10/2002 | Cerwin et al. | |
| 6,968,096 B2 * | 11/2005 | Kittaka et al. | 385/10 |
| 7,184,639 B2 * | 2/2007 | Hamada | 385/129 |
| 7,190,855 B2 * | 3/2007 | Han et al. | 385/24 |
| 7,282,105 B1 | 10/2007 | Plunkett et al. | |
| 2004/0037342 A1 | 2/2004 | Blauvelt et al. | |
| 2005/0265659 A1 | 12/2005 | Miller | |
| 2006/0126992 A1 | 6/2006 | Hashimoto et al. | |
| 2008/0152280 A1 | 6/2008 | Lundquist et al. | |
| 2008/0240654 A1 | 10/2008 | Pearson et al. | |

OTHER PUBLICATIONS

Baskett, J.R. et al., "Anamorphic Condensing Optics for a Slitless Spectrograph," Applied Optics, 1970, pp. 49-52, vol. 9.
Garcia-Botella, A. G. et al., "Elliptical Concentrators," Applied Optics, 2006, pp. 7622-7627, vol. 45.
PCT International Search Report and Written Opinion, PCT Application No. PCT/US2010/036056, Jul. 30, 2010, 8 pages.
Viswanath, A. et al., "Lensless Anamorphic Fourier Transform Hologram Recorded with Prism Systems," Applied Optics, 1997, pp. 5748-5755, vol. 36.

\* cited by examiner

*Primary Examiner* — Jennifer Doan
(74) *Attorney, Agent, or Firm* — Fenwick & West LLP

(57) ABSTRACT

An apparatus consisting of stacked slab waveguides whose outputs are vertically staggered is disclosed. At the input to the stacked waveguides, the entrances to each slab lie in approximately the same vertical plane. A spot which is imaged onto the input will be transformed approximately to a set of staggered rectangles at the output, without substantial loss in brightness, which staggered rectangles can serve as a convenient input to a spectroscopic apparatus. A slit mask can be added to spatially filter the outputs so as to present the desired transverse width in the plane of the spectroscopic apparatus parallel to its dispersion.

16 Claims, 8 Drawing Sheets

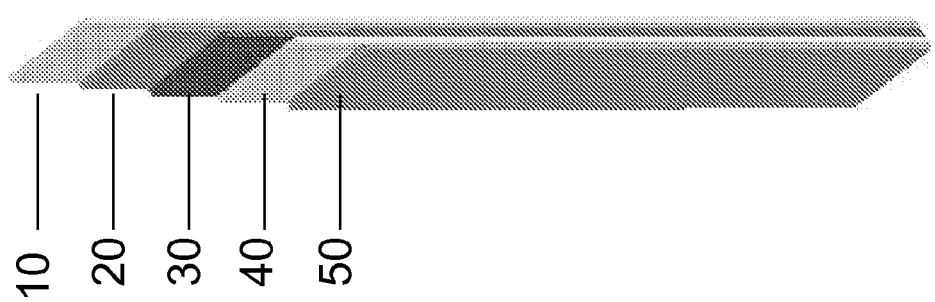

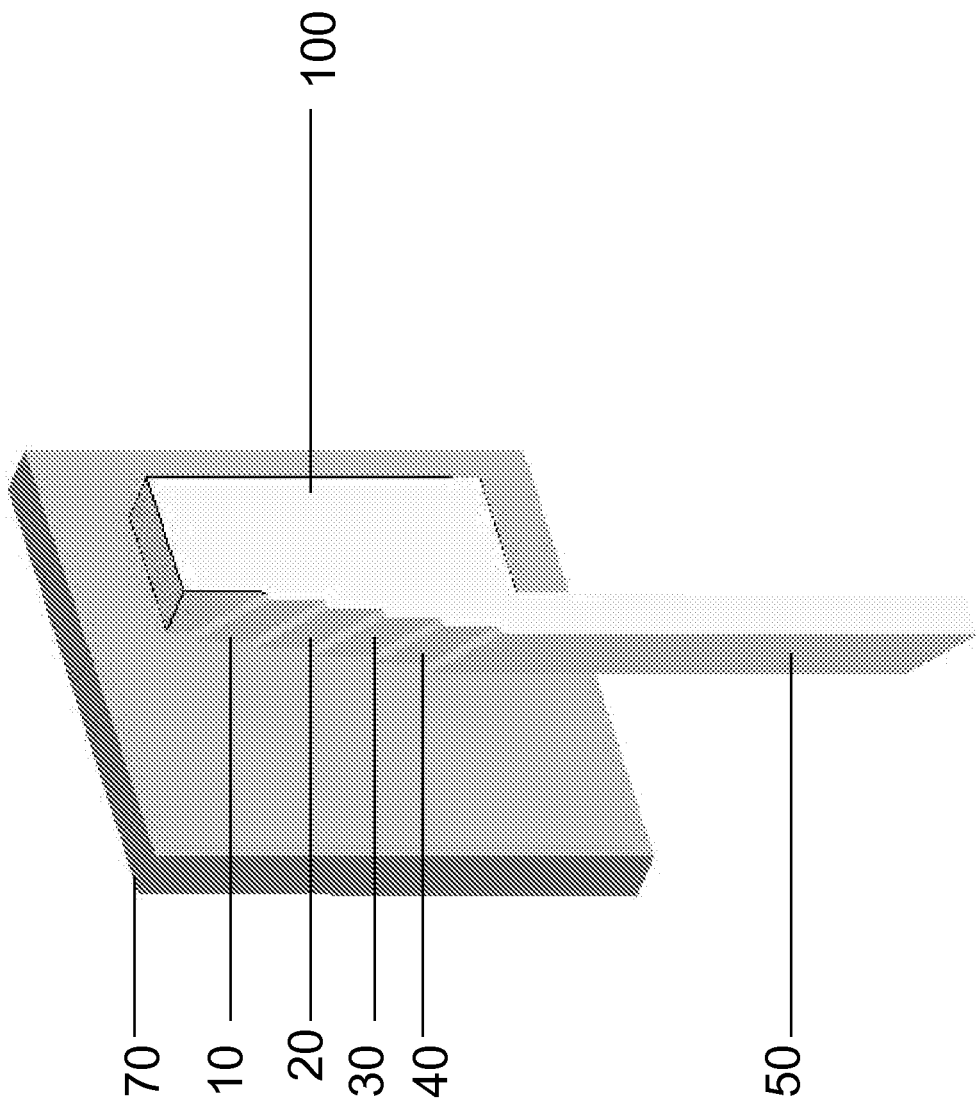

APPARATUS FOR TRANSFORMING THE ASPECT RATIO OF AN OPTICAL INPUT FIELD BASED ON STACKED WAVEGUIDES

CROSS-REFERENCE TO RELATED APPLICATION

This application claims priority under 35 U.S.C. §119(e) to U.S. Provisional Patent Application Ser. No. 61/184,660, filed Jun. 5, 2009, entitled "Apparatus For Transforming The Aspect Ratio Of An Optical Input Field Based On Stacked Waveguides," which is incorporated herein by reference in its entirety.

BACKGROUND OF THE INVENTION

1. The Field of the Invention

This invention relates to the optical transformation of the shape of a nominally circular object to an object with non-unity aspect ratio without substantial loss of brightness. When the aspect ratio of the output is chosen to be high, the resultant shape is particularly appropriate as an input to a diffraction-grating based spectrometer.

2. Background and Relevant Art

When an object is illuminated with a beam of optical radiation for the purpose of gathering light from the object, the optimum shape of the illumination beam is often nearly circular. If for example, the object has volumetric scattering properties, and it is desired to observe the back-scattered radiation, for an imaging system with limited field of view, the optimum geometry for collecting the largest proportion of back-scattered light is to image an area centered on a circular illumination beam.

If it is desirable to subject light which has either been scattered by or transmitted by an object to spectroscopic analysis, and the spectrometer is based on diffraction, it is advantageous to present a nominally rectangular input to the spectrometer of high aspect ratio, where the short axis of the rectangle is in the direction of the dispersion of the spectrometer. Such an arrangement optimizes the resolution of the spectrometer. Hence, if it is advantageous to both collect light from an area having near unity aspect ratio and present a high aspect ratio input of nominally rectangular shape to the spectrometer, it is desirable to find an arrangement which optically converts a near unity aspect ratio spot to a high aspect ratio output. There can, of course, be other circumstances besides spectroscopy where such an optical conversion can be advantageous, and no limitation to spectroscopy for the usefulness of such a converter is implied.

The conversion of near-unity aspect ratio spots to high aspect ratio outputs is sometimes accomplished with a fiber bundle, where the fibers are arrayed in a close packed geometry at the end where light is to be collected and re-arranged in a linear configuration at the opposite end. Such an arrangement will reduce the collection efficiency by approximately the ratio of the area of the fiber cores to the area of the collection bundle. In addition, it is difficult to re-arrange the close packed configuration at one end to the nominally linear configuration at the other end in a short length, hence it is difficult to make the fiber bundle devices compact.

Anamorphic prism pairs have been used for such transformations wherein a nominally collimated beam passes through a first prism and is deflected in angle, thereafter, passing through a second prism which is disposed at an appropriate angle with respect to the first. It is difficult to obtain changes in aspect ratio of more than a factor of five with this arrangement and it is also very difficult to reduce reflection losses at all surfaces and in all polarizations because the beams can be incident at high angles. Moreover, this approach requires a collimated beam which makes the embodiment less compact.

Another optical scheme for performing aspect ratio transforms is an anamorphic lens system as is described in "Anamorphic Condensing Optics for a Slitless Spectrograph", J. R. Baskett, and I. D. Liu, Applied Optics, 9, p. 49-52 (1970). The lens system consists of a spherical lens, followed by a cylindrical lens, followed by a second spherical lens, concluding with a second cylindrical lens. The system is complex, and is not suitable for high numerical aperture applications, and also consumes considerable space.

In yet another approach a non-imaging elliptical concentrator is proposed in, "Elliptical Concentrators", A. G. Garcia-Botella et al., Applied Optics, 45, p. 7622-7627 (2006). The difficulty with such concentrators is that the angular distribution of the input radiation is not preserved, with angular divergences in the two planes scaling inversely with geometrical scaling in the two planes. In many applications the input radiation diverges symmetrically and it is desired that the output radiation nominally preserve this property.

Finally, it is possible to design a diffractive element that provides both wavelength dispersion and transformation of aspect ratio. Such a design is described in "Lensless anamorphic Fourier transform hologram recorded with prism systems", A. Viswanath and K. Srinivasan, Applied Optics, 36, p. 5748-5755 (1997). It is difficult to simultaneously obtain high diffraction efficiency, wide field of view, and high numerical aperture with this design.

BRIEF SUMMARY OF THE INVENTION

These and other limitations are addressed by the present invention, which discloses an apparatus whereby the aspect ratio of an optical input can be changed by a large factor without major sacrifice in brightness, the resultant design also being highly compact.

In one embodiment, multiple slab waveguides having the form of rhomboids, each having a different long dimension but similar widths and thickness are bonded together such that the long edges align. The input surfaces of the rhomboids are all contiguous. The radiation, upon being launched in the slabs is reflected by a first 45° mirror which is one angular face of the rhomboid. The reflected radiation propagates in the waveguides and then encounters the second angular face of the rhomboid which is a second mirror also disposed at 45°. The light exits the subsequent face of the rhomboids but since each rhomboid is a different length, the exit locations are off-set. The resulting output of each rhomboid is roughly rectangular, and each such rectangle is offset from the others in the plane parallel to the short side of the rectangles resulting in a staggered set of nominally rectangular outputs which is suitable for launching into a spectrometer. In particular, the invention disclosed is particularly advantageous when the aspect ratio of the optical input differs by at least a factor of 2 from the aspect ratio of the optical output.

An alternate shape for the waveguide aspect ratio conversion device is also disclosed, based on continuous bending rather than mirrors disposed at 45°.

A slit mask can be attached to the output faces of the rhomboids such that a portion of each rectangular output can be sampled, hence, the equivalent slit width of the spectrometer can be defined by this slit mask whereas otherwise it would be approximately the thickness of the rhomboids.

BRIEF DESCRIPTION OF THE DRAWINGS

FIG. 1A is an isometric drawing of the stack of rhomboids that perform the transformation of the aspect ratio of an input to an output.

FIG. 4 is an isometric drawing of the rhomboid assembly attached to the slit mask by means of an attachment block which is bonded to both.

DETAILED DESCRIPTION OF THE PREFERRED EMBODIMENTS

Figure 1B:
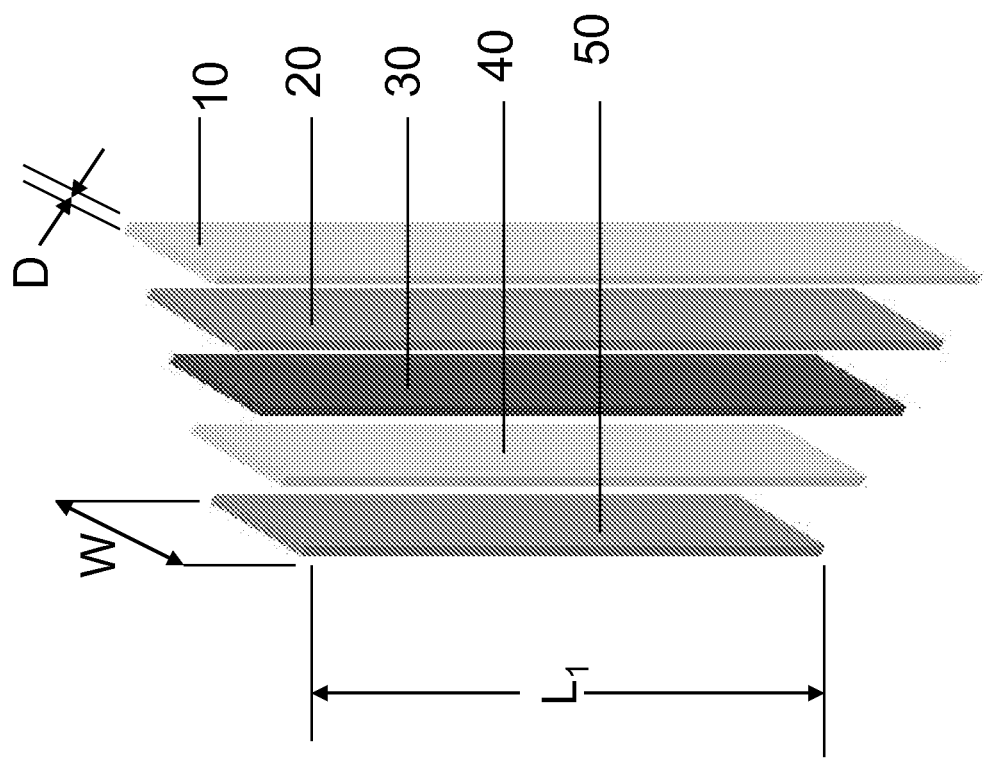
FIG. 1B is an exploded view of the assembly of rhomboids.

Referring to FIG. 1A, an isometric drawing of one preferred embodiment is presented. In this example, five rhomboidal shaped slab waveguides 10, 20, 30, 40, and 50 are attached to each other. An exploded view is presented in FIG. 1B, where the width W, the thickness D, and the length, $L_1$, of one waveguides 50 are defined. In this example the waveguides 10, 20, 30, 40, and 50 all have the same widths, W, and thicknesses D. Their lengths are all different, and are defined as $L_{1,2...5}$. The difference in lengths between any two contiguous waveguides, $L_n - L_{n-1}$, is approximately equal to W, such that each protrudes from its smaller neighbor at the output end by approximately W. In other examples, the volume of any of the slab waveguides is the volume traversed by translating any quadrilateral, including but not limited to a parallelogram or a trapezoid, in a direction perpendicular to the plane of the quadrilateral.

Figure 1C:
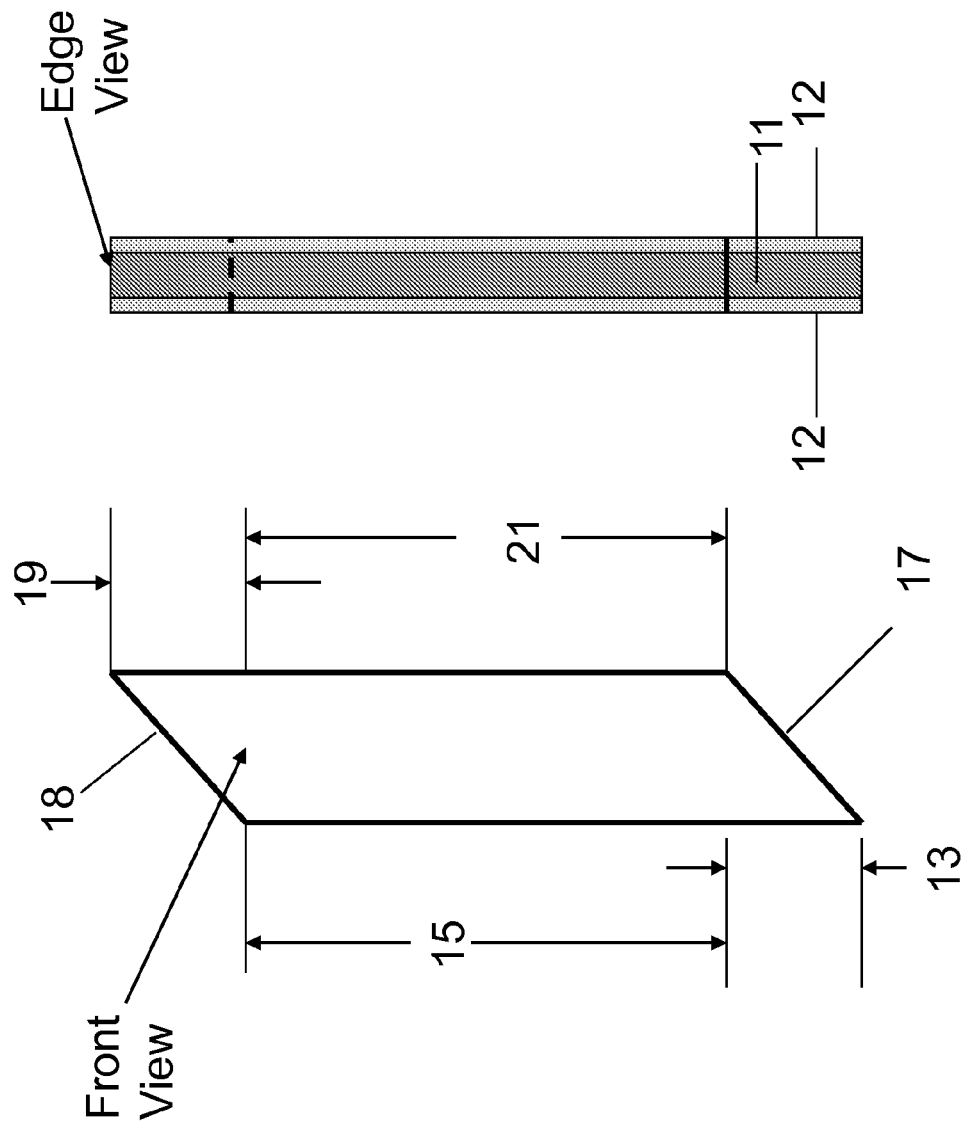
FIG. 1C shows a single rhomboid in two views and defines surfaces having important functionality as well as the layers of the structure.

Two views of a single rhomboid waveguide are presented in FIG. 1C. Regions 13, 15, 17, 18, 19, and 21 are areas on the edges of the rhomboid between the broad plane surfaces which have the shape of rhombuses as shown in the front view of FIG. 1C. Light to be collected is incident on the thin side of the rhomboid in region 13 and it is advantageous to deposit an anti-reflection coating on the thin side in this region. The region 17 is a mirror disposed nominally at 45° and reflects appreciably all the light propagating in the slab waveguide. The propagating light is next incident on mirror surface 18, which reflects the light to output region 19. It is advantageous to deposit an anti-reflection coating in region 19.

The guiding material of the waveguide 11 is advantageously chosen to be a high index glass. In a particularly preferred embodiment, the index of the guiding material 11 is chosen to be sufficiently high such that appreciably all the light incident on mirrors 17 and 18 is totally-internally reflected for the case of an air interface at these surfaces. Glasses with index of refraction greater than 1.8 are good choices for systems with low f-number. Identical claddings 12 are deposited on either side of the guiding material of the waveguide 11 and are chosen from materials having an index of refraction lower than that the guiding material of the waveguide 11, such as silicon dioxide. Alternative choices for the guiding material depend on the wavelength of radiation to be propagated. Optical plastics such as PMMA, polystyrene, or polycarbonate are possible in the visible and near IR regions. Silicon with low doping is advantageous at wavelengths in the region 1-6 um. The general rule is to choose a material with low absorption for the wavelengths to be propagated. Other materials than can be used as claddings 12 are adhesives such as epoxy or silicone. An air cladding is also possible if space is provided between the slabs.

Regions 15 and 21 on the thin sides of the rhomboid can also be coated with a material whose index is lower than that of the guiding material 11 to provide a cladding or they can be left uncoated, in which case an air interface provides the cladding. In a particularly preferred embodiment of this invention, an identical coating is applied to regions 13 and 15, and an identical coating is applied to regions 19 and 21. The coating is designed such that light which is incident on regions 15 and 21 that is within the desired range of propagation angles of the waveguide undergoes total internal reflection whereas light which is incident on region 13 or which exits region 19 undergoes reduced reflection, the coating acting as an anti-reflection coating for the range of angles of the incident or exiting light. An example of a specific implementation of the aforementioned embodiment is the case where the coating consists of a single material. To determine the proper thickness of such a coating it is first noted that approximately ¼ wave thickness of a material whose index is intermediate between the medium from which light is incident, and the medium into which light is entering can act as an anti-reflection coating over a range of angles around 0° with respect to the surface normal. It is then also noted that it is possible to add integral multiples of ½ wave in thickness to the ¼ wave-thickness coating which, for normally incident light will not increase the reflection from the interface between the media. Finally, it is further noted that it is often desirable that a waveguide cladding be thicker than ¼ wave, hence, by addition of integral multiples of approximately ½ wave thickness, a good cladding can be obtained in regions 15 and 21 whereas good anti-reflection properties can be obtained in regions 13 and 19. An example of a suitable coating would be approximately 5/4 of a wave of Magnesium fluoride applied to a glass of index of roughly 1.80. When light is incident in a range of angles in region 13 or exiting in a range of angles in region 19, the optimum thickness for a single layer to suppress reflections can be adjusted, the adjustment in general being in the range of less than ¼ wave thickness, hence, it remains possible to use the identical coating in regions 13 and 15, and the identical coating in regions 19 and 21. A considerable simplification in the fabrication process thereby results as regions 13 and 15, or regions 19 and 21 can be coated simultaneously without the use of a mask.

The widths, thicknesses, and number of slabs are chosen on the basis of the desired targets for the input and output. If the input has near unity aspect ratio, and the number of slabs is n, then the thickness of the assembly is nD, which should be approximately equal to W, the width. If the output of the waveguide assembly is to be input to a spectrometer, the thickness D can be chosen such that the desired resolution is obtained for the dispersion of a particular spectrometer. For example, if a spectrometer has dispersion 0.04 mm/nm and the desired resolution is 2 nm, the thickness D is 0.08 mm.

The slab waveguides can be attached to each other by a direct bonding process such as is possible with silicon dioxide surfaces or with an optical epoxy or silicone.

Figure 2:
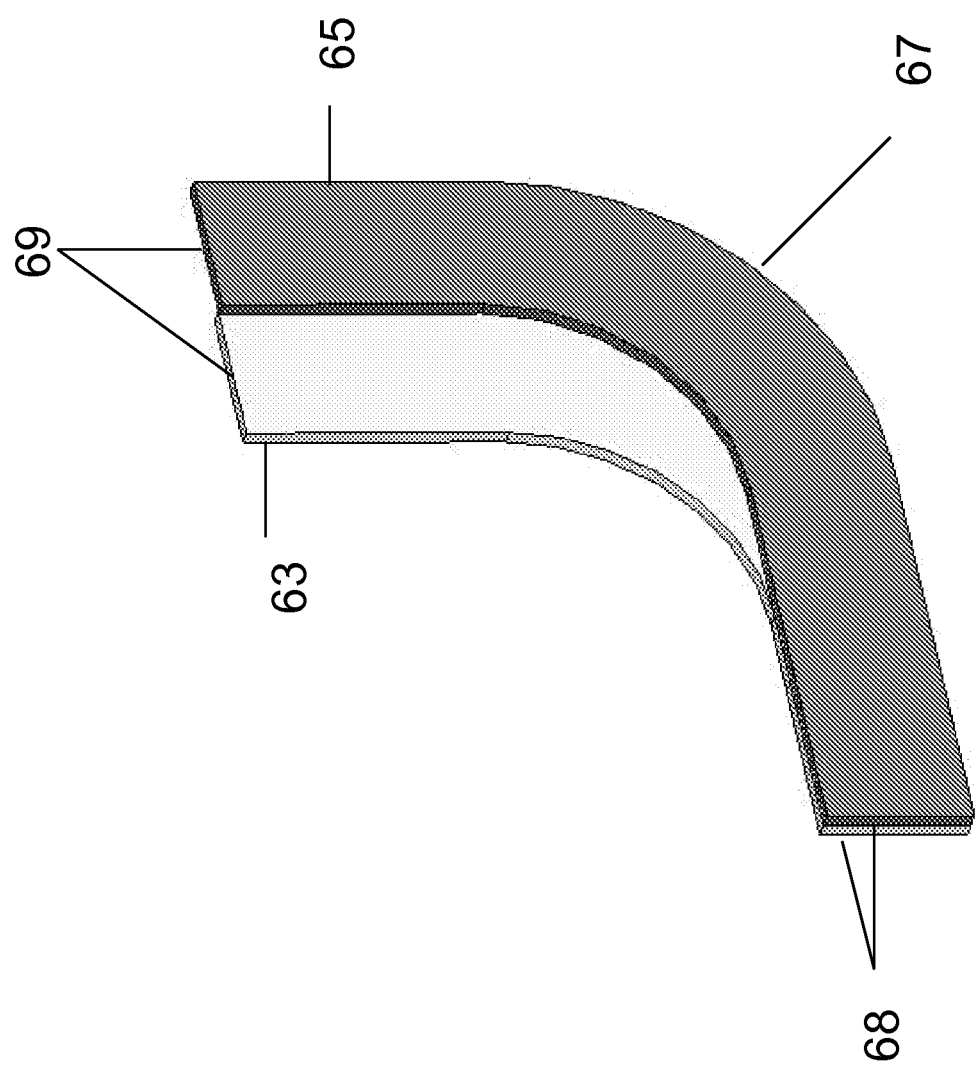
FIG. 2 shows an alternative shape for the waveguide aspect ratio transformer based on continuous bends rather than mirrors.

An isometric drawing of an alternate shape for the slab waveguides is presented in FIG. 2, where two waveguides, 63, and 65 are shown as exemplars, it being understood that more than two can be deployed in the assembly. In this case, light enters input faces 68 and exits output faces 69. The direction of propagation of light is changed according to the bend 67 in the waveguide. Turning of light can be accomplished with combinations of mirrors and bends as desired.

Figure 3A:
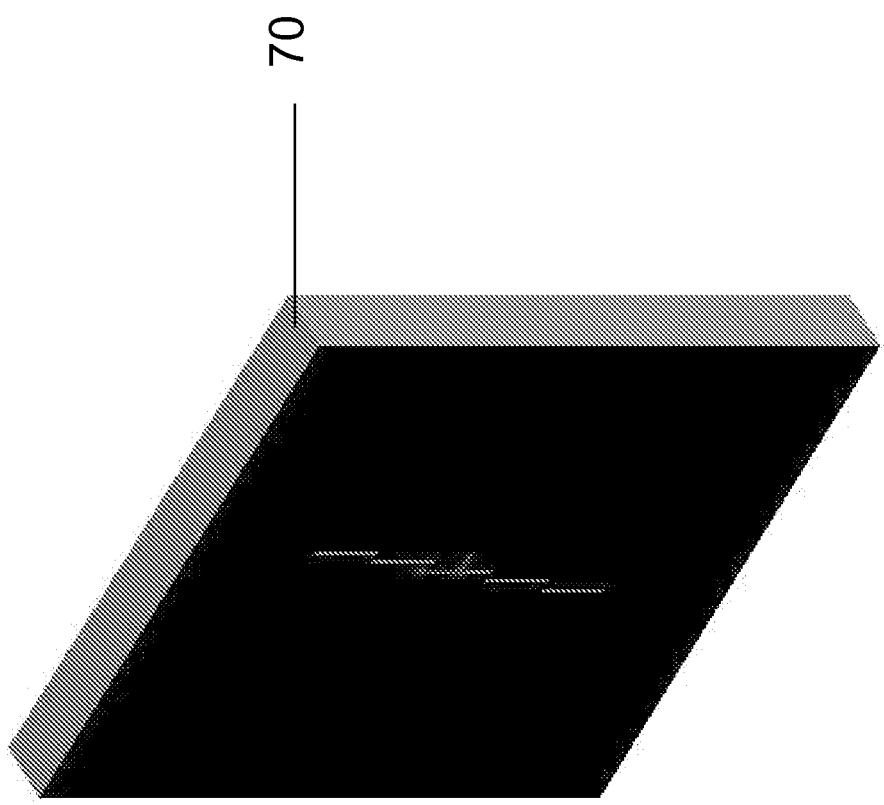
FIG. 3A is an isometric drawing of the slit mask which can be attached to the rhomboid assembly.
Figure 3B:
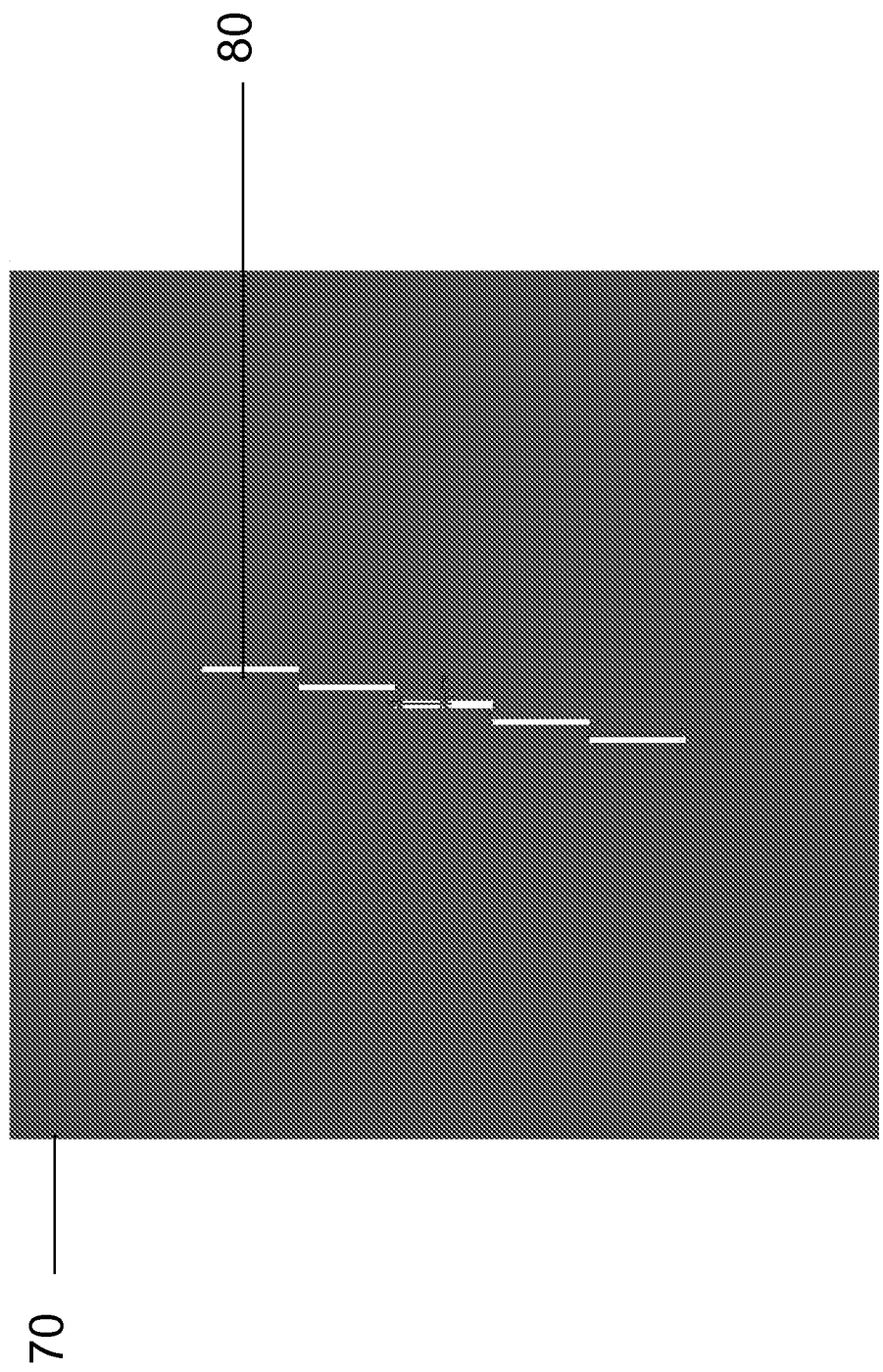
FIG. 3B shows the input side of the slit mask which will receive the output from the rhomboid assembly and FIG. 3C shows the opposite side of the slit mask from which the light will exit.
Figure 3C:
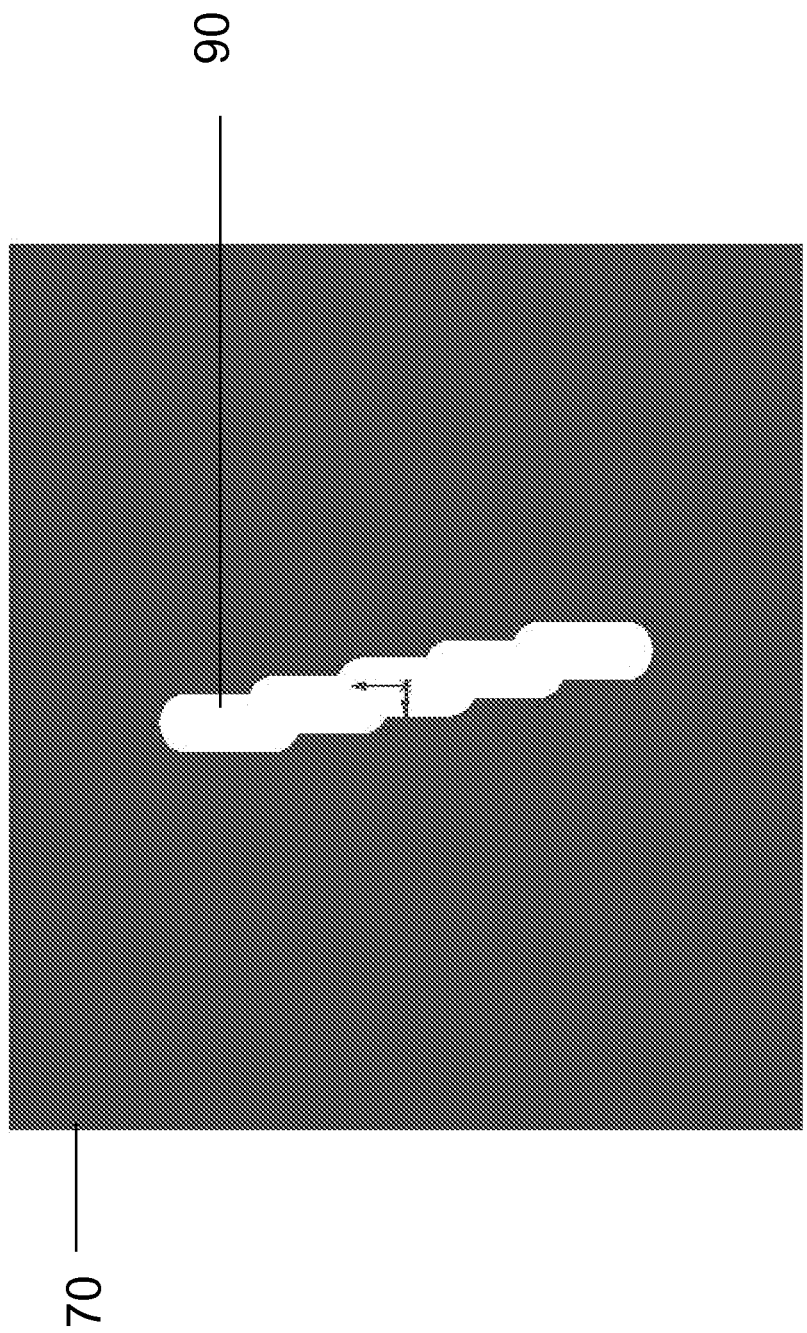

There are cases where it may be advantageous to accept light from a restricted area of the output of the waveguide assembly. One example may be where it is mechanically advantageous to use slabs of thickness D greater than that which would be acceptable for obtaining the desired resolution, when the output of the waveguides are used as input for a spectrometer. In that case, it can be advantageous to mask off some part of the nominally rectangular output of each slab waveguide to reduce the dimension of the input in the plane of the dispersion of the spectrometer. An isometric drawing of a slit mask 70 is presented in FIG. 3A. The front side of the slit mask 70 is shown in FIG. 3B, whereas the opposite surface is shown in FIG. 3C. The slit 80 shown on the front side in FIG. 3B is intended to mask the output of the slab-waveguide assembly which will be brought into close proximity to the slit mask 70, the mask pattern being aligned to the outputs of the waveguides. The width of the nominally rectangular opening 80 in the slit mask 70 is chosen to be less than D. A secondary mask 90 on the reverse side of the slit mask 70, is presented in FIG. 3C. The purpose of the secondary mask 90 is to absorb back-propagating radiation in order to avoid multiple reflections between the slit mask and the detector. In addition, the slit pattern defines the transmittance angle of the mask in one dimension so as not to over-fill any subsequent spectrometer optics in that dimension. The material in which the openings for the slit mask are created should be nominally opaque to the radiation. They are also ideally chosen to have low reflectance as the slit is a reciprocal surface to a detector in many spectrometers and it is often best to avoid multiple reflections between these surfaces. The substrate material of the slit mask is a transparent material such as glass. It is advantageous to deposit an anti-reflection coating on both surfaces of the substrate.

An isometric drawing of an assembly of slab waveguides 10, 20, 30, 40 and 50 to a slit mask 70 is presented in FIG. 4. A block 100 is attached both to the slab-waveguide assembly, and the slit mask 70 to facilitate manipulation during alignment between the two, and the subsequent bonding of the parts with an adhesive. A UV curing adhesive is convenient for bonding the block 100 to the slit mask 70 in which case the block 100 is fabricated from a material which is sufficiently transparent to UV, such as glass. If it is desired that the output faces of the slabs not be in direct contact with the slit mask 70, a small well-defined spacing is advantageously obtained by using an adhesive which has been partially filled with microspheres of well controlled diameter. Alternatively, tape of known thickness can be used between the block 100 and the slit mask 70.

The output of the slab-waveguide assemblies presented is a staggered pattern. The pattern can of course be rotated about its center such that the center of each segment is aligned vertically. If many slabs are used, an increasingly good approximation to a vertical object of approximately rectangular form can be obtained.

It is possible also to construct an output which is close to a single rectangle if the waveguides are flexible. For example, the design presented in FIG. 2 can have such an output if the waveguide 65 is bent in an S-curve configuration to align the output ends 69.

A staggered output can be beneficially used in spectroscopy if the detector array of the spectrometer is two dimensional. In that case the assignment of wavelengths to each row of detectors can be distinct and account for the offset in the direction parallel to that of the dispersion. Also, it is possible to create a one dimensional detector array whose detectors have a shape similar to the staggered pattern. As spectrometers often also have curvature of the contours of constant wavelength, this curvature can also be accounted for in shaping the detectors.

Curvature of the constant wavelength contours of a spectrometer can also be compensated by shaping the output ends of the slab waveguide assembly such that they approximate this curvature. Such a shape can be advantageously created by molding.

Although the detailed description contains many specifics, these should not be construed as limiting the scope of the invention, but merely as illustrating different examples and aspects of the invention. It should be appreciated that the scope of the invention includes other embodiments not discussed in detail above. Various other modifications, changes and variations which will be apparent to those skilled in the art may be made in the arrangement, and details of the apparatus of the invention disclosed herein without departing from the spirit and scope of the invention.

The invention claimed is:

1. An apparatus for converting a shape of an optical input to a differently shaped optical output, comprising:
    at least two stacked slab waveguides wherein a location light is input along a portion of one side of each of the waveguides is distinct from a location light is output from one side of each of the waveguides;
    wherein the volume of any of the stacked slab waveguides is the volume traversed by translating a quadrilateral in a direction perpendicular to the plane of the quadrilateral;
    wherein there is a geometrical difference between each waveguide such that the location light is output from each of the waveguides is displaced in at least two directions with respect to each other, or the location light is input to each of the waveguides is displaced in at least two directions with respect to each other;
    wherein an aggregate area of the locations light is input to the waveguides corresponds approximately to the shape of the optical input; and
    wherein an aggregate area of the locations light is output from the waveguides corresponds approximately to a desired shape of optical output, wherein the desired shape of the optical output is different from the shape of the optical input.

2. The apparatus of claim 1, wherein the quadrilateral is a parallelogram.

3. The apparatus of claim 1, wherein two of the angles between respective adjacent edges in the plane of the quadrilateral are substantially 45°.

4. The apparatus of claim 3, wherein the at least two slab waveguides are rhomboids, each having a different long dimension.

5. The apparatus of claim 1, where at least one side perpendicular to the plane of the quadrilateral is a mirror.

6. The apparatus of claim 5, wherein at least some light propagating in the waveguide undergoes total internal reflection at the mirror.

7. The apparatus of claim 1, wherein the locations light is input and output of the waveguides are antireflection coated.

8. The apparatus of claim 7, wherein the coating of the locations light is input and output of the waveguides extends substantially along an entire length of those sides and acts as a waveguide cladding in areas distinct from the locations light is input and output.

9. The apparatus of claim 8, wherein the coating has a thickness substantially of ¼ wavelength plus an integral number of half wavelengths of the input light in an index of the coating material.

10. The apparatus of claim 1, wherein a guiding material of the waveguides is glass with an index greater than 1.80.

11. The apparatus of claim 1, wherein an aggregate area of the locations light is output from the waveguides is further restricted by a mask.

12. The apparatus of claim 1, wherein the outputs from the waveguide are curved so as to compensate for a curvature of constant wavelength contours in a spectrometer to which the apparatus inputs light.

13. The apparatus of claim 1, wherein one or more sides of the slab waveguides are curved, wherein a form of the curvatures differs between waveguides so as to produce a displacement either in the location light is output from each of the waveguides with respect to each other, or in the location light is input from each of the waveguides with respect to each other.

14. The apparatus of claim 1, wherein the shape of the optical input is nominally circular, and the desired shape of the optical output is a staggered set of nominally rectangular outputs from the waveguides.

15. The apparatus of claim 1, wherein the ratio of the aspect ratio of the optical input to the aspect ratio of the optical output is less than 0.5.

16. The apparatus of claim 1, wherein the ratio of the aspect ratio of the optical input to the aspect ratio of the optical output is greater than 2.0.

* * * * *